United States Patent [19]

Iwami et al.

[11] Patent Number: 5,832,406
[45] Date of Patent: Nov. 3, 1998

[54] VEHICLE NAVIGATION APPARATUS AND METHOD FOR ROUTE FINDING AT ROAD CROSSINGS

[75] Inventors: Hiroaki Iwami, Iwaki; Shigeru Ichikawa, Nakanosima-machi, both of Japan

[73] Assignee: Alpine Electronics, Inc., Japan

[21] Appl. No.: 925,871

[22] Filed: Sep. 9, 1997

Related U.S. Application Data

[63] Continuation of Ser. No. 518,518, Aug. 23, 1995, abandoned.

[30] Foreign Application Priority Data

Sep. 16, 1994 [JP] Japan .................................. 6-221545

[51] Int. Cl.⁶ .............................................. G06F 165/00
[52] U.S. Cl. .......................... 701/202; 701/211; 340/990; 340/995
[58] Field of Search ................................. 701/201, 202, 701/207, 208, 209, 211, 213; 73/178 R; 340/988, 990, 995

[56] References Cited

U.S. PATENT DOCUMENTS

| | | | |
|---|---|---|---|
| 4,887,081 | 12/1989 | Iihoshi et al. | 340/995 |
| 5,323,321 | 6/1994 | Smith, Jr. | 364/449 |
| 5,406,492 | 4/1995 | Suzuki | 364/449.3 |
| 5,410,486 | 4/1995 | Kishi et al. | 364/449.5 |
| 5,444,629 | 8/1995 | Kishi et al. | 364/449.5 |
| 5,486,822 | 1/1996 | Tenmoku et al. | 364/444.2 |
| 5,544,060 | 8/1996 | Fujii et al. | 364/444.1 |
| 5,557,522 | 9/1996 | Nakayama et al. | 364/449.2 |

*Primary Examiner*—Gary Chin
*Attorney, Agent, or Firm*—Brinks Hofer Gilson & Lione

[57] ABSTRACT

When a driver inputs a destination to a vehicle navigation system, a route search unit searches a shortest guided route connecting a starting location as a present location to the destination using map data stored in a CD-ROM and stores the shortest route in a guided route storage unit. When a route preconducting/indicating key is pressed after the search of the guided route, a guided route preconducting unit automatically draws to a video RAM route information composed of a shape of a crossing, a course, names of roads and a name of the crossing sequentially from the starting location for respective crossings where a course changes on the guided route from the present location to the destination, using guided route data stored in the guided route storage unit and the map data stored in the CD-ROM. An image of the video RAM is read out by an image conversion unit, output to a display unit after having been converted into a predetermined image signal, and displayed on a screen. With this arrangement, the driver can check the guided route from the present location to the destination before departure and/or any time before arrival.

30 Claims, 9 Drawing Sheets

FIG. 2

| LONGITUDE / LATITUDE | CROSSING DISCRIMINATION FLAG |
|---|---|
| FIRST NODE (STARTING LOCATION) | 0 |
| SECOND NODE | 0 |
| THIRD NODE | 1 |
| ⋮ | ⋮ |
| K-th NODE | 0 |
| (K+1)-th NODE | 1 |
| ⋮ | ⋮ |
| n-th NODE (DESTINATION) | 0 |

15 GUIDED ROUTE STORAGE UNIT

VEHICLE NAVIGATION APPARATUS AND METHOD FOR ROUTE FINDING AT ROAD CROSSINGS

This application is a continuation of application Ser. No. 08/518,518, filed Aug. 23, 1995, now abandoned.

BACKGROUND OF THE INVENTION

1. Field of the Invention

The present invention relates to a navigation apparatus to be mounted on an automotive vehicle, and more specifically, to a navigation apparatus to be mounted on a vehicle and arranged to search an optimum guided route on roads connecting a starting location to a destination using road map data, and guiding the driver on the optimum route using searched guided route data.

2. Description of the Related Art

A conventional navigation apparatus mounted on a vehicle includes a CD-ROM (or equivalent) in which map data is stored, a map data storage unit such as an IC (integrated circuit) memory card or the equivalent, a display unit, and a vehicle position sensing unit such as a GPS receiver for detecting the present position and present direction of a vehicle. The apparatus reads out map data containing the present position of the vehicle from the CD-ROM, draws a map image including the vehicle position at the center thereof based on the map data, displays the map image on a display screen, and fixes a vehicle position mark (location cursor) at the center of the display screen. This indicates where the vehicle is located at present to the driver, at a glance, by scrolling map images on the screen depending upon the movement of the vehicle, or by moving the vehicle position mark while fixing the map image on the screen.

Maps stored in the CD-ROM (or equivalent) are divided into longitudes and latitudes each having a suitable width in accordance with a scale of e.g. 1/12500, 1/25000, 1/50000, 1/10000; roads are displayed by a set of coordinates of nodes represented by the longitudes and latitudes. A road is composed of two or more nodes connected to each other, and a road portion connecting two nodes is called a link. The map data is composed of (1) a road list, a node table, a node list constituting crossings, a map matching consisting of a crossing network list, and a route searching road layer; (2) a background layer for displaying roads, buildings, facilities, parks, rivers and the like on a map screen; and (3) a character/symbol layer for displaying the characters, map symbols and names of administrative districts such as names of cities, towns and villages, names of roads, names of crossings (road junctions) and names of buildings.

The navigation apparatus is provided with a route guiding function, thereby allowing the driver to easily travel toward a desired destination without losing his way. The route guiding function automatically searches for a nearest route connecting a starting location to a destination by carrying out a simulation such as e.g. the Dijkstra method or bft method using map data, and stores the result of the simulation as guided route data, wherein the driver can simply understand an optimum route to his destination as follows. In a first guiding method (see FIG. 9A), a guided route GR is displayed on a screen by being drawn on a map image MP in a thick line with a color different from the other displayed roads, together with a vehicle position mark CM.

In a second guiding method, when the vehicle gets closer to a point within a certain distance of a crossing CP on a guided route where the vehicle must change its course, an arrow NR indicating a new course is drawn to the crossing CP on the image map MP at the point the vehicle must change its course, and the arrow NR is displayed on the screen together with the vehicle position mark CM as shown in FIG. 9B. Alternatively, in a third guiding method, when the vehicle gets closer to a point within a certain distance to a crossing CP on a guided route where the vehicle must change its route, the distance to the crossing where the vehicle must change its route and the new course are output audibly (by an announcement) through conventional sound synthesization.

There is a need that the driver be able to check a guided route from a present location to a destination, before the driver departs or before the driver arrives at the destination (after departure) so that the driver can roughly understand the route. This allows him to concentrate his attention on safe driving, without frequently looking at the screen, and without relying on audible announcements advising of the route while traveling. This allows the driver to plan locations to e.g. take a rest, refuel the vehicle, or stop to make a purchase, as well as to plan a bypass for avoiding e.g. a traffic jam, a closed road, or a danger zone.

In the aforesaid first guiding method, however, since it is impossible to display the entire guided route from the present location to the destination on a single screen, maps must be scrolled along the guided route, which is a complex task. Further, in the second and third guiding methods, since route guiding information cannot be obtained unless the vehicle actually travels along the guided route, the guided route cannot be checked prior to arrival at the destination.

Thus there is a need for a vehicle navigation apparatus by which a user can check the guided route from a present location to the destination, before the driver departs and/or before the driver arrives at the destination.

SUMMARY

According to the present invention, the above problem is solved by a vehicle navigation apparatus including map data storage in which map data is stored, a vehicle position sensor for detecting a vehicle position, a route search unit for searching an optimum guided route connecting a starting location to a destination, a guided route storage unit for storing guided route data, a map image drawing unit for drawing a map image of the vehicle position using the map data together with a vehicle position mark and displaying the map image on a display, and a route guide unit for guiding a route for the vehicle using the guided route data, the navigation apparatus including a command unit for commanding it to preconduct the guided route, and a guided route preconducting unit for drawing route information upon command. The route information includes a shape of a crossing (road junction), a course, names of roads or/and a name of the crossing sequentially from the starting location side using the guided route data and the map data with respect to respective crossings where a course changes on a guided route from a present location to the destination, automatically or in response to a switching command, and displaying the route information on the display.

According to the present invention, when the apparatus is commanded to preconduct a guided route by the command unit, the route information is drawn sequentially from a starting location side using the guided route data and the map data with respect to respective crossings where a course changes on the guided route from a present location to a destination, automatically or in response to a switching command and displayed on the display. With this arrangement, since the course on the guided route from the present location to the destination can be checked in a short time by a simple operation, the driver (user) can drive safely, by roughly understanding the route. Further, the driver can easily plan locations to rest, refuel the vehicle, or stop to make a purchase, as well as to plan a bypass for avoiding e.g. a traffic jam, a closed road, or a danger zone.

The guided route preconducting unit draws route information including a shape of a crossing, a course, names of roads or/and a name of the crossing also with respect to crossings where the course on the guided route does not change, but the guided route crosses a road having a width greater than the guided route, and displays the route information on the display. With this arrangement, the user can check the guided route from the present location to the destination in detail, including not only the crossings where the course changes but also the crossings where the course does not change but where one is liable to be lost because the guided route crosses a wider road.

When it is commanded to preconduct a guided route, the guided route preconducting unit outputs audibly route information including names of roads or/and a name of a crossing, and a course sequentially from a starting location side using guided route data and map data with respect to respective crossings where a course changes on the guided route from a present location to a destination, automatically or in response to a switching command. With this arrangement, since the course on the guided route from the present location to the destination can be checked in a short time by a simple operation without the need of observing a screen, the user can drive safely by roughly understanding the route.

Further, the guided route preconducting unit outputs audibly route information including a shape of a crossing, a course, names of roads or/and a name of the crossing, also with respect to crossings where the course on a guided route does not change but the guided route crosses a road having a width greater than the guided route. With this arrangement, the driver can check the guided route from the present location to the destination in detail, including not only the crossings where the course changes but also the crossings where the course does not change but where one is liable to be lost because the guided route crosses a wider road.

BRIEF DESCRIPTION OF THE DRAWINGS

FIG. 2 is a diagram of data to be stored in the guided route storage unit of the apparatus;

DESCRIPTION OF PREFERRED EMBODIMENTS

Figure 1:
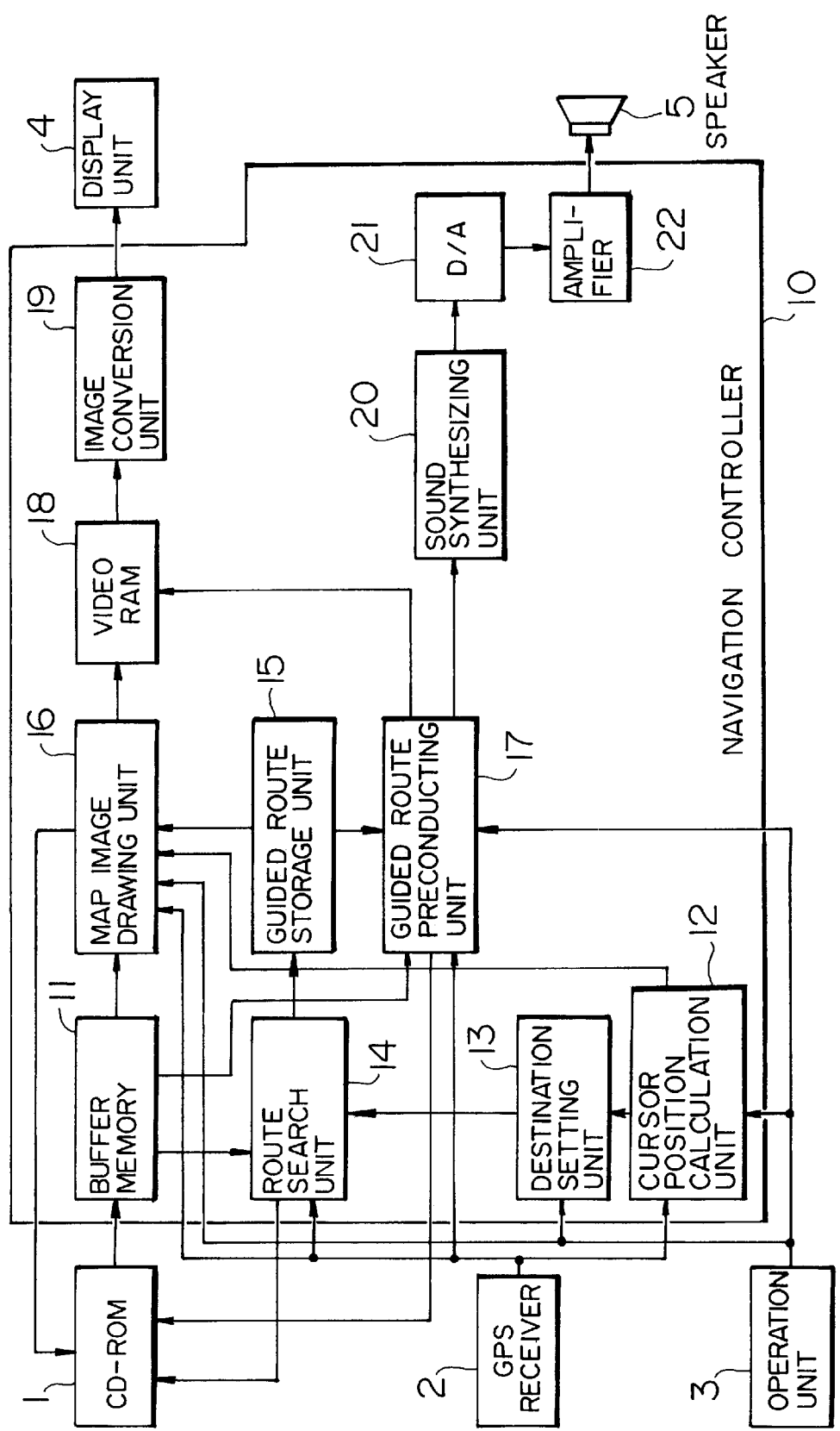
FIG. 1 is a block diagram showing a vehicle navigation apparatus according to an embodiment of the present invention.

FIG. 1 is a block diagram showing an overall arrangement of a navigation apparatus mounted on a vehicle according to an embodiment of the present invention. In FIG. 1, numeral 1 denotes a conventional CD-ROM in which map data is stored which includes a road layer, a background layer, a character/symbol layer and the like for each reduced scale; numeral 2 denotes a conventional GPS receiver for detecting a vehicle position and vehicle direction by a satellite navigation system; numeral 3 denotes an operation unit including a cursor key for scrolling maps, a destination input key, and a route preconducting/indicating key, and a route preconducting stop key; numeral 4 denotes a conventional display unit for displaying a route information image of a map image and a guided route; and numeral 5 denotes a conventional speaker for outputting the guided route information audibly.

Numeral 10 denotes a navigation controller including a microcomputer which under software control draws a map image including a present location of a vehicle using the map data stored in the CD-ROM 1 and displays the map image on the display unit 4 together with a vehicle position mark. When a destination desired by the driver is input, the navigation controller 10 automatically searches for the shortest route connecting the present location (starting location) to the destination by e.g. the Dijkstra method or bft method using the map data, stores the shortest route as the guided route, then draws the guided route on the map image in a color different from the other roads, and displays the guided route on the display unit 4 together with a vehicle position mark for; the guidance of the route. Further, when the driver presses, after the optimum route is searched, the route preconducting/indicating key and commands the system to preconduct an optimum route to a destination before departure and/or before arrival at the destination, the navigation controller automatically draws route information. This route information includes a shape of a crossing, names of roads, a name of the crossing, and a course using guided route data and the map data sequentially from the starting location side. The course includes both crossings where the course on the guided route changes and crossings where the course on the guided route does not change, but the guided route crosses a road having a width greater than that of the guided route. The system then displays the route information on the display, as well as outputs route information audibly which includes the names of the roads, the name of the crossing, and the course.

In the navigation controller 10, numeral 11 denotes a buffer memory in which the map data read out from the CD-ROM 1 is stored, numeral 12 denotes a cursor position calculation unit for calculating a cursor position by operating the cursor key, numeral 13 denotes a destination setting unit for setting a cursor position as a destination when the destination input key is pressed, and numeral 14 denotes a route search unit for reading out necessary map data from the CD-ROM 1 to the buffer memory 11 when a destination is set and searching a shortest route connecting a starting location as a present location to the destination by e.g. the Dijkstra method or bft method using the map data read out to the buffer memory 11. Numeral 15 denotes a guided route storage unit for storing a node data train as a guided route data which is obtained by arranging data constituting the route searched by the route search unit 14 in the sequence of the route node. As shown in FIG. 2, each node data entry includes the coordinate data of longitude and latitude and a crossing discriminating flag showing whether a node is a crossing node (road junction) or not.

Numeral 16 denotes a map image drawing unit arranged such that when a route is not being guided by the system, the unit 16 reads out map data including a vehicle position stored in the CD-ROM 1 to the buffer memory 11 based on the vehicle position and a vehicle direction detected by the GPS receiver 2, and draws a map image whose north direction is directed upward and in which the vehicle position is located at the center thereof, together with a vehicle position mark directed to the vehicle direction. On the other hand, when the route is to be guided, the map image drawing unit 16 further reads out guided route data which is within an area to be drawn of a map image from the guided route storage unit 15, and draws a guided route which is highlighted by a thick line of a specific color on the map image. Numeral 17 denotes a guided route preconducting unit for selecting, when the user presses the route preconducting/indicating key and commands to preconduct a route before the departure or before the arrival at a destination, crossings where the course on the guided route changes and crossings where the course does not change but the guided route crosses a road having a width greater than the guided route using the guided route data and the map data, and automatically drawing route information including a shape of a crossing, names of roads, a name of the crossing, and a course sequentially from the starting location side with respect to the selected crossings, as well as outputting sound data including the names of the roads, the name of the crossing, and the course.

Numeral 18 denotes a conventional video RAM in which an image drawn by the map image drawing unit 16 or the guided route preconducting unit 17 is stored; numeral 19 denotes a conventional image conversion unit for reading out the image stored in the video RAM 18, converting the read image into a predetermined image signal and outputting the signal to the display unit 4; numeral 20 denotes a conventional sound synthesizing unit for synthesizing a digital sound signal in accordance with sound data of the guided route preconducting unit 17 and outputting the synthesized digital sound signal; numeral 21 denotes a conventional D/A converting unit for subjecting the digital sound signal to digital to analog conversion; and numeral 22 denotes a conventional amplifier for amplifying an output from the D/A converting unit 21 and driving the conventional speaker 5.

While FIG. 1 shows various blocks having particular designations it is to be understood that these designations are not limiting and that they are intended to describe any circuitry and/or software carrying out the described functions.

Figure 3:
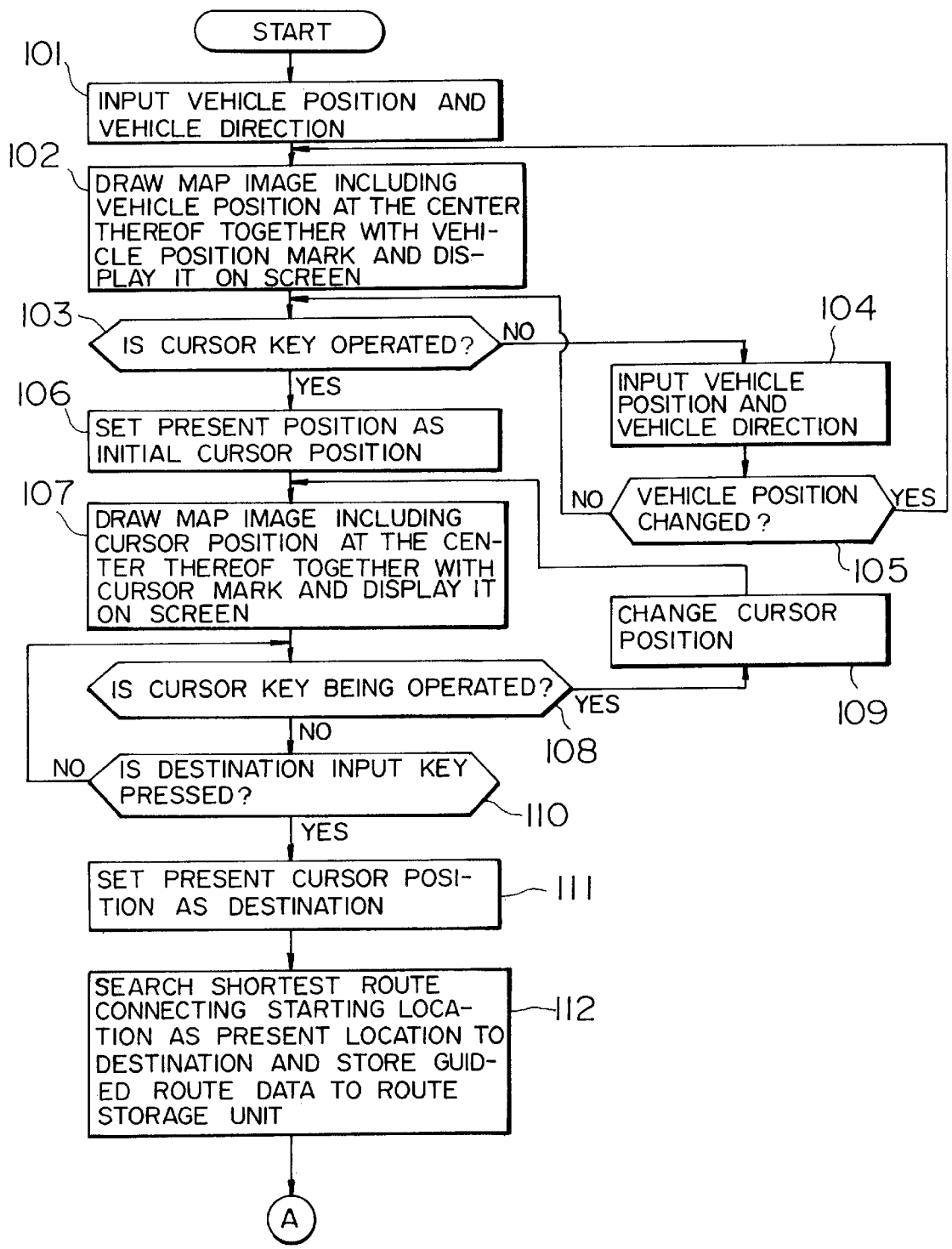
FIG. 3 is a first flowchart showing operation of the navigation controller of the apparatus.
Figure 4:
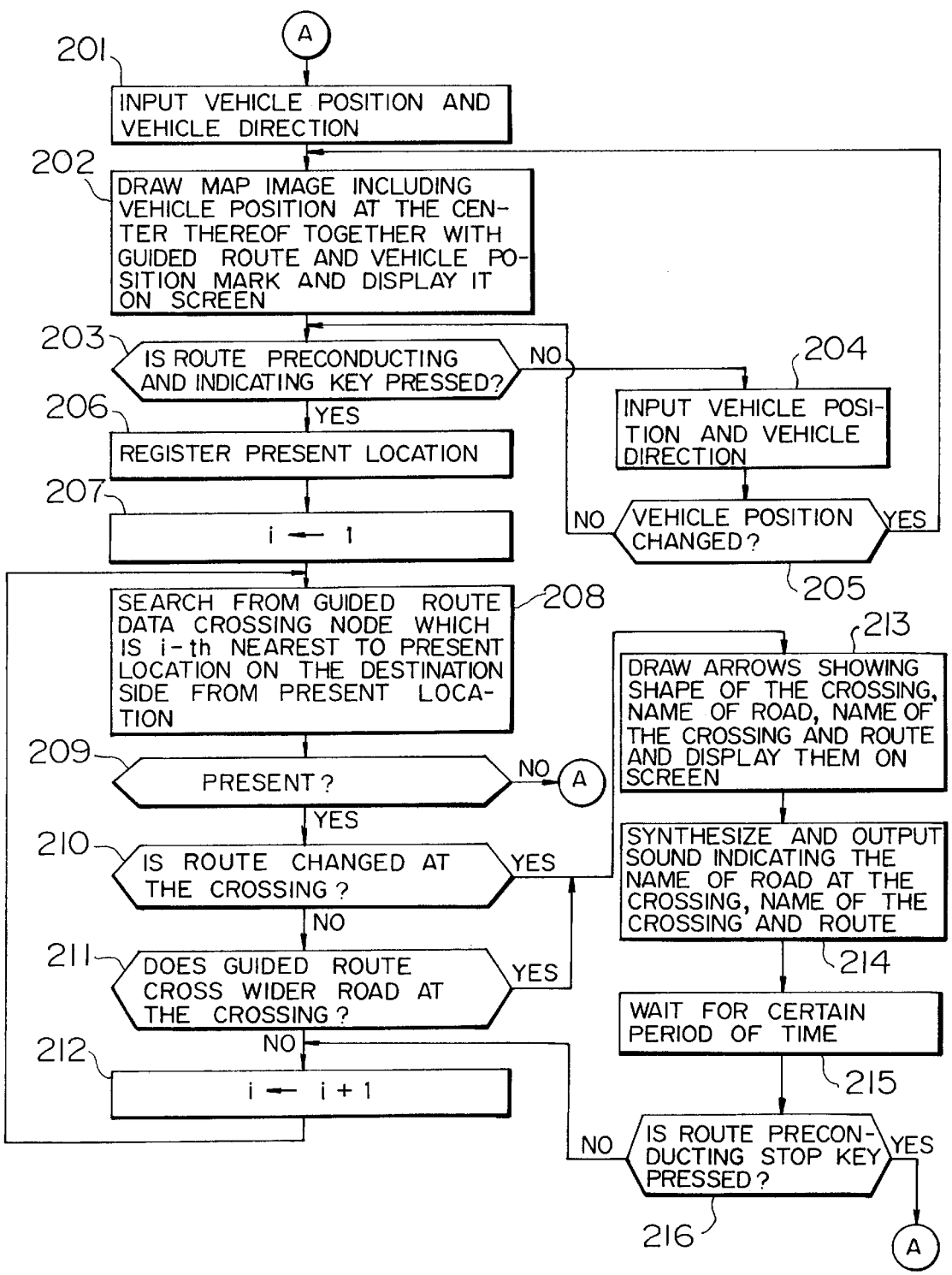
FIG. 4 is a second flowchart showing operation of the navigation controller.
Figure 5:
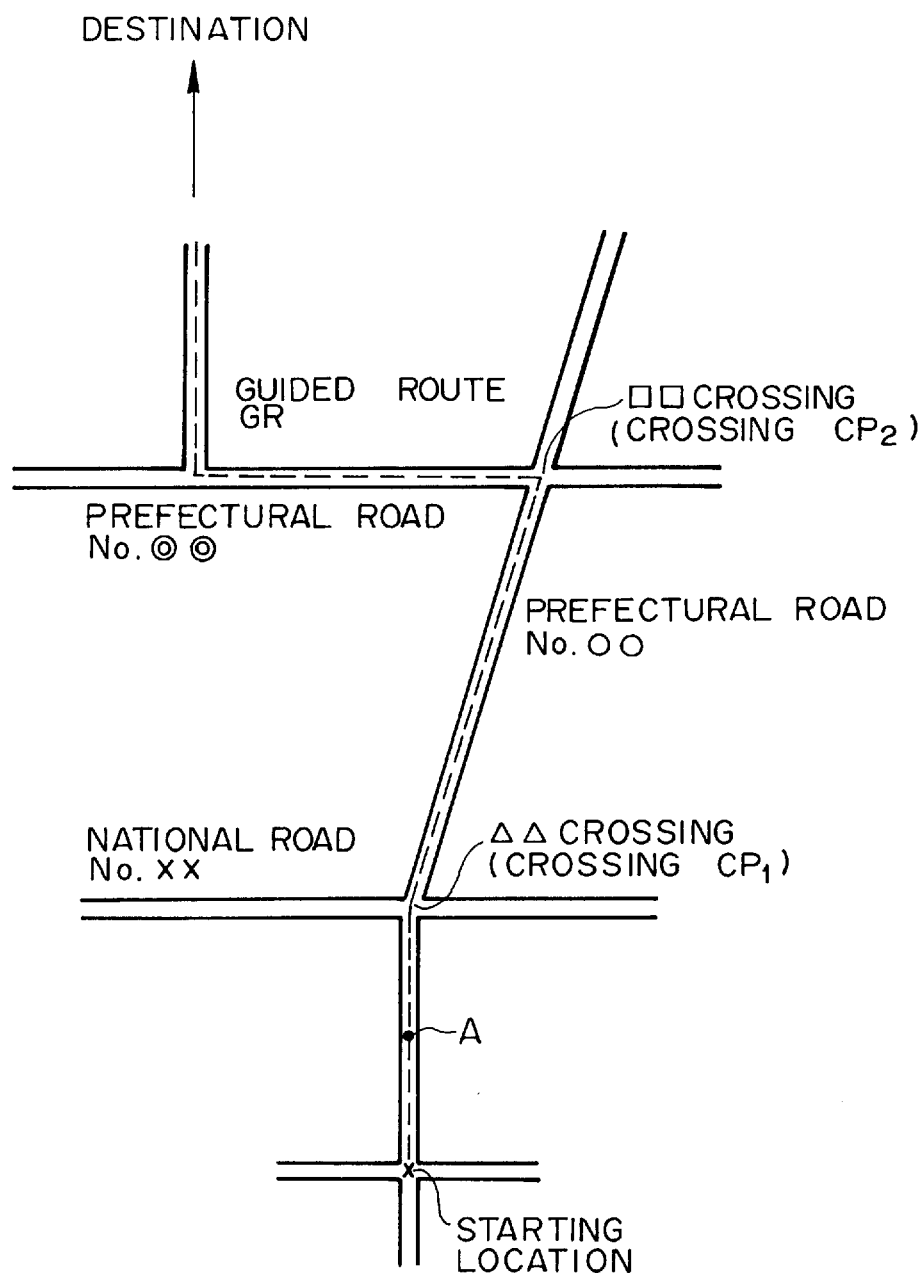
FIG. 5 is a diagram explaining a guided route searched by the guided route search unit of the apparatus.
Figure 6:
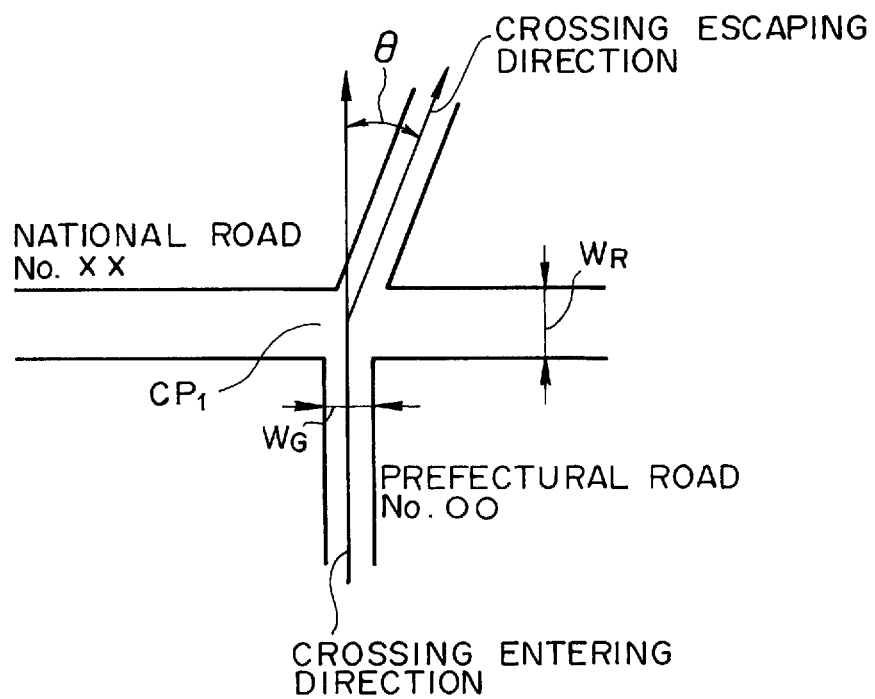
FIG. 6 is a diagram explaining operation of the guided route preconducting unit of the apparatus.

FIGS. 3 and 4 are flowcharts showing operation of the navigation controller 10, FIG. 5 is a diagram showing a guided route searched by the route search unit 14, FIG. 6 is a diagram showing operation of the guided route preconducting unit 17, and FIGS. 7A, 7B and 8A, 8B are diagrams showing examples displayed on the screen of the system. The following description is in accordance with these figures.

Usual Navigation Processing

When the system power supply is turned on, the GPS receiver 2 conventionally periodically detects vehicle position and vehicle direction by the satellite navigation system. On the other hand, after the power supply is turned on, the map image drawing unit 16 in the navigation controller 10 receives vehicle position data and vehicle direction data from the GPS receiver 2 (step 101 of FIG. 3), reads out map data including the vehicle position from the CD-ROM 1 to the buffer memory 11, and draws a map image whose north direction is directed upward and in which the vehicle position is located at the center thereof to the video RAM 18, using the read map data together with a vehicle position mark directed to the vehicle direction and located at the center of the map image. The image of the video RAM 18 is read out by the image converting unit 19 and output to the display unit 4 after having been converted into a predetermined image signal (step 102).

Figure 7A:
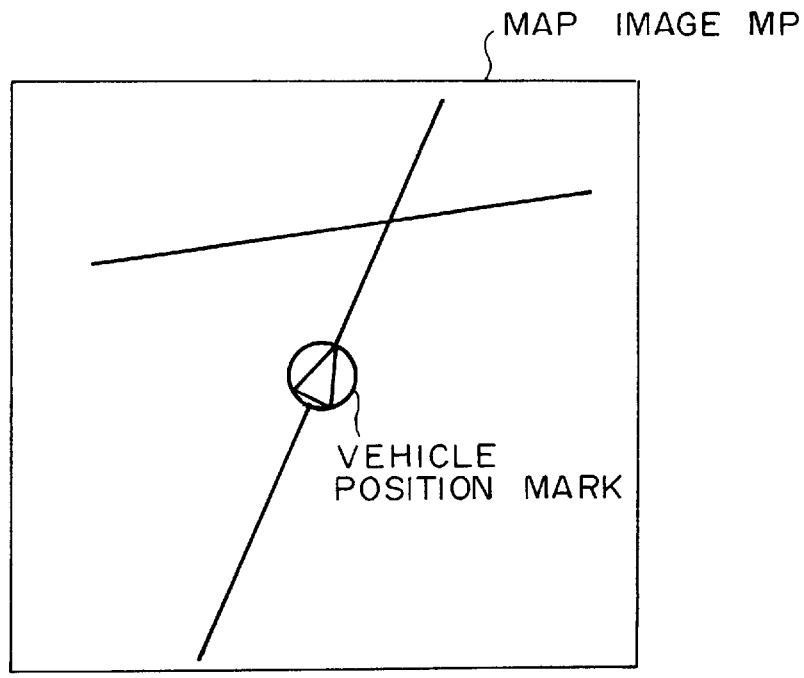
FIGS. 7A and 7B show examples displayed on the apparatus screen.

As a result, a map image MP including the vehicle position is displayed on the screen together with a vehicle position mark CM as shown in FIG. 7A.

Thereafter, the navigation controller 10 checks whether the cursor key on the operation unit 3 is depressed or not (step 103) and if not, the map image drawing unit 16 receives vehicle position data and vehicle direction data from the GPS receiver 2 (step 104) and checks whether the vehicle position changes or not (step 105). If the vehicle position changes, the process goes to step 102 and draws a map image having a new vehicle position at the center thereof together with the vehicle position mark and displays the map image on the screen, and if the vehicle position does not change, the process returns to step 103.

The flowcharts of FIGS. 3 and 4 illustrate a computer program (software) executed by the microprocessor resident in navigation controller 10. Given these flowcharts, writing the corresponding program is well within the skill of one ordinarily skilled in the art.

Guided Route Search Processing

When the driver wants to travel to a desired destination along an optimum route from a present starting location, the driver searches for the destination by scrolling maps using the cursor key. At the time, when the operation of the cursor key starts, the cursor position calculation unit 12 initializes a present vehicle position detected by the GPS receiver 2 as an initial cursor position (steps 103, 106) and then the driver continuously changes a cursor position by operating the cursor key (steps 108, 109). Further, the map image drawing unit 16 reads out map data including the cursor position from the CD-ROM 1 to the buffer memory 11 and draws a map image whose north direction is directed upward and in which the cursor position is located at the center thereof to the video RAM 18 using the read map data (step 112). Then, the map image drawing unit 16 draws a cursor mark at the center on the map image (step 113). The image in the video RAM 18 is read out by the image conversion unit 19 and output to the display unit 4 after having been converted into a predetermined image signal (step 107). As a result, the image map on the screen is scrolled by the operation of the cursor key as well as the cursor mark is displayed at the center of the map image.

When the destination input key is pressed at the time the cursor coincides with the destination (YES at step 110), the destination setting unit 13 sets the cursor position as the destination and outputs it to the route search unit 14 as destination data (step 111). The route search unit 14, to which the destination data is input, sets the present location detected by the GPS receiver 2 as the starting location, reads out map data covering the range from the starting location to the destination from the CD-ROM 1 to the buffer memory 11, and searches for a shortest route connecting the starting location to the destination using particularly a road layer in the map data by e.g. the Dijkstra method or bft method. Then, route search unit 14 causes the guided route storage unit 15 to store a node data train constituting the searched route as guided route data (step 112). A crossing discriminating flag is set with respect to a crossing node on the guided route.

The guided route searched this time is arranged as shown in FIG. 5 by dotted line GR.

Route Guide Processing

On completion of the search of the guided route as described above, the map image drawing unit 16 receives vehicle position and vehicle direction from the GPS receiver 2 (step 201 of FIG. 4), reads out map data including the vehicle position to the buffer memory 11 from the CD-ROM 1, draws a map image whose north direction is directed upward and in which the vehicle position is located at the center thereof to the video RAM 18 using the read map data, and further draws a guided route which is highlighted by a thick line of a predetermined color on the map image using node data within an drawing area of the map image in the guided route storage unit 15. Thereafter, the map image drawing unit 16 draws the vehicle position mark directed to the vehicle direction located at the center of the map image. The image in the video RAM 18 is read out by the image conversion unit 19 and output to the display unit 4 after having been converted into a predetermined image signal (step 202).

Figure 7B:
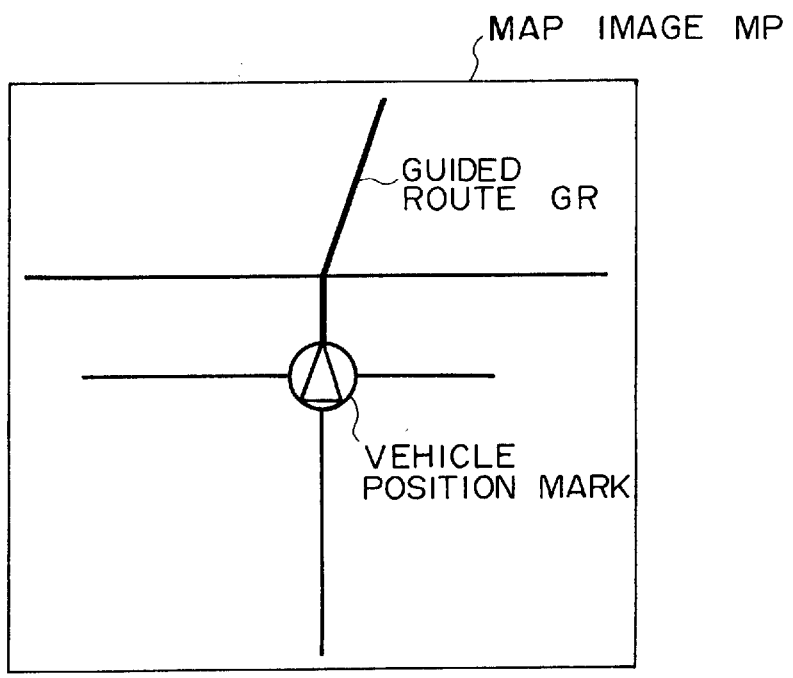

As a result, a map image MP including the vehicle position is displayed on the screen together with a guided route GR and a vehicle position mark CM as shown in FIG. 7B.

Thereafter, the navigation controller 10 checks whether the route preconducting/indicating key in the operation unit 3 is depressed or not (step 203) and if not, the map image drawing unit 16 receives vehicle position data and vehicle direction data from the GPS receiver 2 (step 204) and checks where the vehicle position changes or not (step 205). If the vehicle position changes, the process goes to step 202 and draws a map image having a new vehicle position at the center thereof together with a guided route and the vehicle position mark and displays the map image on the screen, and if the vehicle position does not change, the process returns to step 203.

With this operation, the driver can easily arrive at the desired destination by traveling along the guided route as shown on the screen from the starting location.

Guided Route Preconducting Processing

The driver presses the route preconducting/indicating key in the operation unit 3 when he wants to check on an overall guided route from the present location to the destination and roughly understand the guided route before departure (or arrival).

Then the guided route preconducting unit 17 registers the present location detected by the GPS receiver 2 at the time, sets i=1 (steps 203, 206, 207) and searches for a crossing node which is nearest to a present location on the destination side from the registered position, referring to the coordinates of longitude and latitude and a crossing discrimination flag of the node data in the guided route data stored in the guided route storage unit 15 (step 208). For example, when the driver presses the route preconducting/indicating key when the vehicle is at point A in FIG. 5, point A is set as the registered position and a crossing $CP_1$ where e.g. Prefectural Road No: O O crosses National Road No. x x is found on the guided route GR. Thus, it is determined YES by the guided route preconducting unit 17 at step 209. Next, after map data containing the crossing node is read out to the buffer memory 11 from the CD-ROM 1, it is checked whether the course of the guided route must be changed at the crossing $CP_1$ because an angle e between the direction in which the guided route enters the crossing $CP_1$ and the direction in which the guided route escapes (leaves) from the crossing $CP_1$ is greater than e.g. 22.5° as shown in FIG. 6 (step 210). If it is determined YES at step 210, the process goes to step 213.

If it is determined NO at step 210, the width WG of Prefectural Road No. O O on the guided route is further compared with the width WR of National Road No. x x which crosses the guided route at the crossing $CP_1$, by referring to the road layer in the map data read to the buffer memory 11 to check whether the guided route crosses a road having a greater width as shown in FIG. 6 (step 211). When it is determined YES at step 211, the process goes to step 213, and if it is determined NO, i is incremented (step 212) and then the process returns to step 208 and a crossing node which is second nearest to the registered position A on the destination side from the registered position A.

Figure 8A:
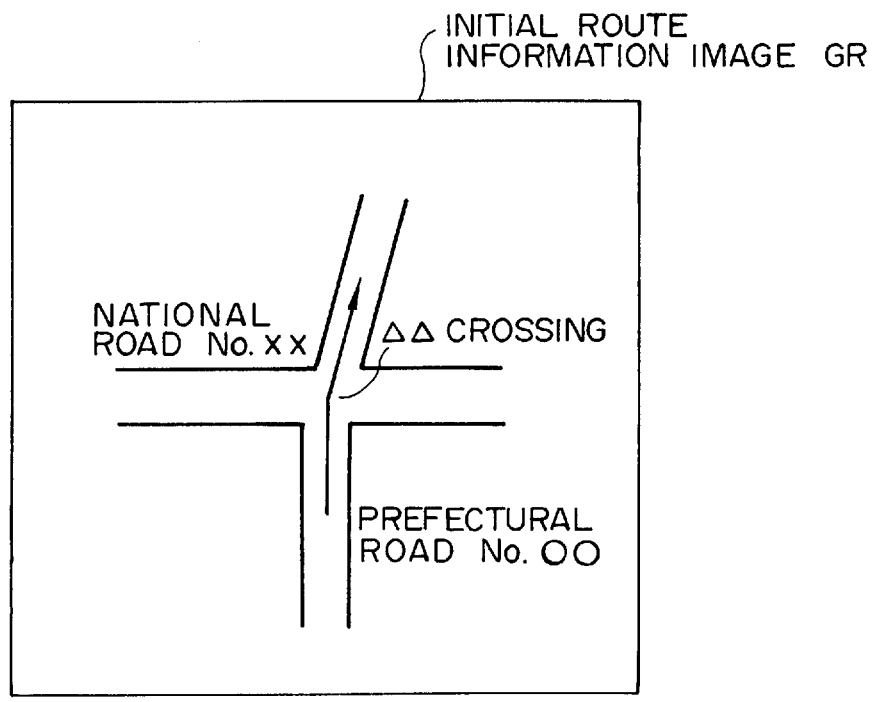
FIGS. 8A and 8B show other examples displayed on the apparatus screen.

The course of the guided route does not change here because the angle 0 between the direction in which the guided route enters the crossing $CP_1$ and the direction in which the guided route escapes from the crossing $CP_1$ is smaller than e.g. 22.5° at the $CP_1$. However, when the width WR Of the road crossing the guided route is greater than the width WG of the guided route, the guided route preconducting unit 17 recognizes the crossing $CP_1$ as a crossing to be preconducted and draws the shape of the crossing $CP_1$ to the video RAM 18 using the map data and guided route data, each read out to the buffer memory 11, together with the name of each road and the name of each crossing. Then, the guided route preconducting unit 17 draws a route information image to the video RAM 18 by drawing an arrow indicating a course at the crossing $CP_1$ in the vicinity of the center of the crossing. The route information image in the video RAM 18 is read out by the image conversion unit 19, output to the display unit 4 after having been converted into a predetermined image signal and displayed on the screen (step 213). An initial route information image RG as shown in FIG. 8A is displayed on the screen.

Following the above step, the guided route preconducting unit 17 determines whether the course of the guided route at the crossing $CP_1$ is any one of a straight course, right turn course or left turn course, from the relationship between the direction in which the guided route enters the crossing $CP_1$ and the direction in which the guided route departs from the crossing $CP_1$ thereat, and creates sound data (an announcement) expressing course information such as "go straight along Prefectural Road No. O O at a ^ ^ crossing where Prefectural Road No. O O crosses National Road No. x x" by combining the names of the roads crossing at the crossing $CP_1$, the name of the crossing and the course and outputs the sound data to the sound synthesizing unit 20 so that a digital sound signal is output by synthesized sound. After having been converted into an analog sound signal by the D/A conversion unit 21, the digital sound signal is amplified by the amplifier 22 and output from the speaker 5 (step 214).

The driver finds from the route information image and route information announcement that the guided route will pass through the ^ ^ crossing where Prefectural Road No. O O crosses National Road No. x x in the vicinity of a present location, i.e., the crossing $CP_1$, and the driver has to go straight without changing course at crossing $CP_1$.

After the navigation controller 10 performs processing at step 213, it waits for a predetermined period of time (e.g. a few seconds), (step 215) and checks whether the route preconducting stop key is pressed or not (step 216). If it is not pressed at step 216, i is incremented to 2 (step 212) and then the process returns to step 208 and searches for a crossing node which is second nearest to the registered position A on the destination side of the position A from the guided route data stored in the guided route storage unit 15 (step 208). As shown in FIG. 5, since a crossing $CP_2$ is where Prefectural Road No. O O crosses Prefectural Road No. @ @ on the guided route GR, the guided route preconducting unit 17 determines YES at step 209. Next, after map data including this crossing node is read out to the buffer memory 11 from the CD-ROM 1, it is checked whether the crossing $CP_2$ is a crossing where the course is to be changed because the angle o between a direction in which the guided route enters the crossing $CP_2$ and a direction in which the guided route departs from the crossing $CP_2$ is greater than e.g. 22.5° (step 210, refer to FIG. 6).

Figure 8B:
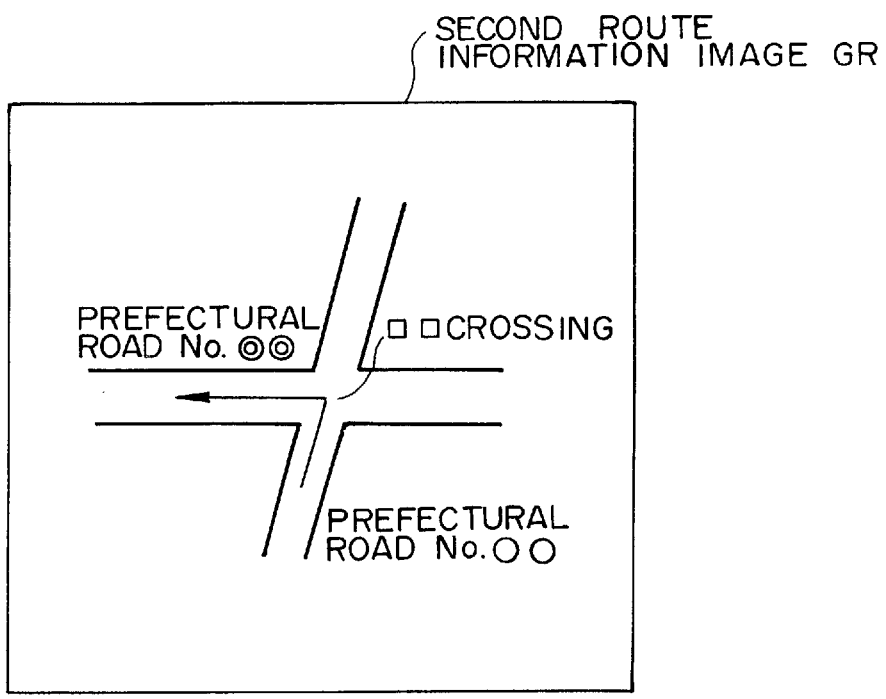
Figure 9A:
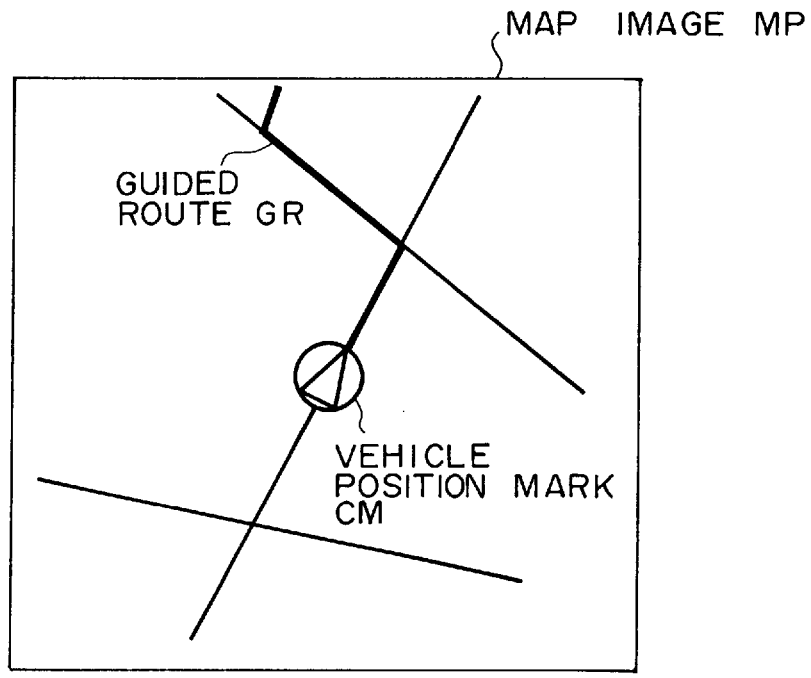
FIGS. 9A and 9B show a conventional route guiding method.
Figure 9B:
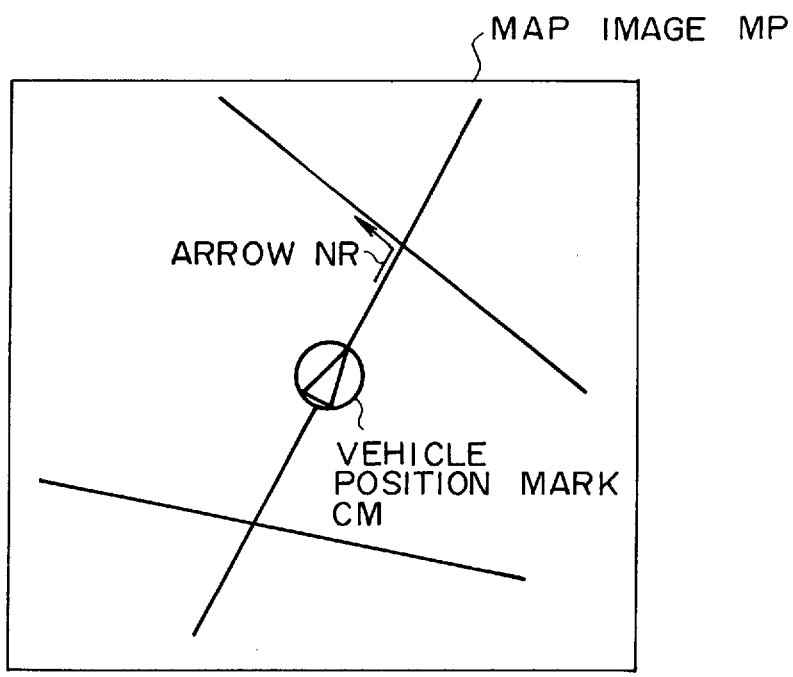

If it is determined YES at step 210, the process goes to step 213 and the guided route preconducting unit 17 recognizes the crossing $CP_2$ as a second crossing to be preconducted and draws the shape of the crossing $CP_2$ to the video RAM 18 using the map data and guided route data read out to the buffer memory 11 together with the name of each road and the name of each crossing. Then, the guided route preconducting unit 17 draws a route information image to the video RAM 18 by drawing an arrow indicating a course at the crossing $CP_2$ in the vicinity of the center of the crossing. The route information image in the video RAM 18 is read out by the image conversion unit 19, output to the display unit 4 after having being converted into a predetermined image signal and displayed on the screen (step 213). A second route information image RG as shown in FIG. 8B is displayed on the screen.

Following the above step, the guided route preconducting unit 17 determines whether the course of the guided route at the crossing $CP_2$ is any one of a straight course, right turn course or left turn course, from the relationship between the direction at which the guided route enters the crossing $CP_2$ and the direction in which the guided route departs from the crossing $CP_2$. Then the guided route pre-conducting unit 17 creates sound data expressing course information such as "turn to the left at a □ □ crossing where Prefectural Road No. O O crosses Prefectural Road No. @ @", by combining the names of the roads crossing at the crossing $CP_1$, the name of the crossing and the course in sound, and outputs the sound data to the sound synthesizing unit 20 so that a digital sound signal is output by synthesized sound. After having been converted into an analog sound signal by the D/A conversion unit 21, the digital sound signal is amplified by the amplifier 22 and output from the speaker 5 (step 214).

As a result, the user finds from the route information image and route information sound that the guided route will pass through the □ □ crossing $CP_2$ located next to the previous crossing $CP_1$ where Prefectural Road No. O O crosses Prefectural Road No. @ @ , i.e., the crossing $CP_2$, and the course of the guided route changes at the □ □ crossing $CP_2$ by turning to the left.

After the navigation controller 10 performs processing at step 213, it waits for a predetermined period of time of (a few seconds), (step 215) and checks whether the route preconducting stop key is pressed or not (step 216). If it is determined NO at step 216, i is incremented to 3 (step 212) and then the process returns to step 208 and repeats the same processing.

When the guided route preconducting unit 17 cannot find an i-th crossing on the destination side from the registered position A on the guided route in the processing effected at step 208, it is determined NO by the guided route preconducting unit 17 at step 209. The navigation controller 10 then returns to step 201 and executes a route guide processing. Note, when the driver has finished the check of the guided route before it is determined NO at step 209, the driver can return the navigation controller 10 to step 201 by pressing the route preconducting stop key so that the navigation controller 10 executes the route guide processing (steps 216, 201).

According to this embodiment, after the driver has searched a guided route, he presses the route preconducting/indicating key at any optional time before departure or arrival. With this simple operation, the driver can automatically and sequentially observe route information images, each including a shape of a crossing, a course, names of roads and a name of the crossing. This is in respect both to crossings where a course changes and crossings where the course does not change, but where the route is liable to be lost because the guided route crosses a wider road there. As a result, the user can check the route from the present location to the destination in detail in a short time, and drive safely by roughly understanding the route.

Further, the user can sequentially hear (through audible output) route information including a shape of a crossing, a course, names of roads and a name of the crossing, for both of crossings where a course changes and crossings where the course does not change, but one is liable to be lost because the guided route crosses a wider road there, without the need to observe the display screen. As a result, the driver can check the route from the present location to the destination in detail in a short time while driving, and drive safely by roughly understanding the route.

Note, although crossings where the course of a guided route does not change but the guided road crosses a wider road are selected as crossings to be preconducted, these crossings may be omitted from the crossings to be preconducted, and only crossings where the course changes are preconducted. Further, although a course from a present location to a destination can be checked by both an image and sound, either may be selected. Further, although both names of roads and a name of a crossing which constitute each of crossings to be preconducted are arranged to be preconducted, either may be preconducted.

As described above, according to the present invention when it is commanded to preconduct a guided route, route information including a shape of a crossing, a course, names of roads or/and a name of the crossing is drawn sequentially from a starting location side using guided route data and map data, for respective crossings where a course changes on a guided route from a present location to a destination, automatically or in response to a switching command, and the route information is displayed on the screen. Thus, the course of the guided route from the present location to the destination can be checked in a short time by a simple operation, and thus the user can drive safely by roughly understanding the route. Further, the user can easily plan locations to rest, refuel the vehicle, or stop to make a purchase, as well as plan a bypass for avoiding e.g. a traffic jam, a closed road, or a danger zone.

The guided route preconducting unit also draws route information including a shape of a crossing, a course, names of roads or/and a name of the crossing for respective crossings where the course of a guided route does not change, but the guided route crosses a road having a width greater than the guided route, and displays the route information on the display. Consequently, the driver can check the guided route from the present location to the destination in detail, including such crossings where the course does not change but the route is liable to be lost because the guided road crosses the wider road.

When it is commanded to preconduct a guided route, the guided road preconducting unit outputs audibly route information including names of roads or/and a name of a crossing, and a course sequentially from a starting location to a destination using guided route data and map data for each crossing where a road to be traveled changes on a guided route from a present location to a destination, automatically or in response to a switch command. Thus, the course of the guided route from the present location to the destination can be checked in a short time by a simple operation without observing the screen, and thus the user can drive safely.

Further, the guided route preconducting unit also outputs audibly route information including a shape of a crossing, a course, names of roads or/and a name of a crossing for respective crossings where the course of a guided route does not change but the guided route crosses a road having a width greater than the guided route, from the present location to the destination. Consequently, the user can check in detail not only the crossings where the course changes but also such crossings where the course does not change one but is liable to be lost because the guided road crosses the wider road.

This disclosure is not limiting; further modifications will be apparent to one skilled in the art in the light of this disclosure, and are intended to fall within the scope of the appended claims.

What is claimed is:

1. A vehicle navigation apparatus having a route search unit for searching an optimum guided route from a starting location to a destination, a storage unit for storing guided route data, and a route guide unit for guiding a route for the vehicle using the guided route data, and comprising:

a command unit for issuing a command to preconduct said guided route; and a guided route preconducting unit for drawing on a display, upon said command, predetermined route information sequentially from the starting location using said guided route data only for a road crossing where a course changes on said guided route from a present location to the destination and for a road crossing where the course on said guided route crosses a road having a width greater than that of a road on said guided route.

2. A navigation apparatus according to claim 1, wherein at each of said road crossings the course on said guided route changes by an angle greater than a predetermined angle.

3. A navigation apparatus according to claim 1, wherein said route information includes at least names of roads or a name of a road crossing.

4. A navigation apparatus according to claim 3, wherein said route information includes a shape of a road crossing, a course, names of roads or a name of the road crossing.

5. A vehicle navigation apparatus having a map data storage unit in which map data is stored, a vehicle position sensor for detecting a vehicle position, a route search unit for searching an optimum guided route from a starting location to a destination, a guided route storage unit for storing guided route data, a map image drawing unit for drawing a map image of the vehicle position using the map data together with a vehicle position mark and displaying the map image on a display, and a route guide unit for guiding a route to the vehicle using the guided route data, and comprising:

a command unit for issuing a command to preconduct said guided route; and a guided route preconducting unit for drawing on said display, upon said command, route information sequentially from the starting location using said guided route data and said map data for a road crossing only where a course changes on said guided route and for a road crossing where the course on said guided route crosses a road having a width greater than that of a road on said guided route.

6. A navigation apparatus according to claim 5, wherein at each of said road crossings said course on said guided route changes by an angle greater than a predetermined angle.

7. A navigation apparatus according to claim 5, wherein said map data storage unit is selected from a group consisting of an IC card, a CD-ROM and a hard disk drive.

8. A vehicle navigation apparatus having a route search unit for searching an optimum guided route from a starting location to a destination, a storage unit for storing guided route data, and a route guide unit for guiding a route to the vehicle using the guided route data, and comprising:

a command unit for issuing a command to preconduct said guided route; and a guided route preconducting unit for audibly outputting, upon said command, predetermined route information sequentially from the starting location using said guided route data for a road crossing only where a course changes on said guided route and for a road crossing where the course on said guided route crosses a road having a width greater than that of a road on said guided route.

9. A navigation apparatus according to claim 8, wherein at each of said road crossings the course on said guided route changes by an angle greater than a predetermined angle.

10. A navigation apparatus according to claim 8, wherein said route information includes at least names of roads and a name of a road crossing.

11. A navigation apparatus according to claim 8, wherein said route information includes names of roads or a name of a road crossing, and a course.

12. A navigation apparatus according to claim 11, wherein said route information includes at least names of roads or a name of a road crossing.

13. A navigation apparatus according to claim 11, wherein said route information includes names of roads or a name of a road crossing, and a course.

14. A vehicle navigation apparatus having a map data storage unit in which map data is stored, a vehicle position sensor for detecting a vehicle position, a route search unit for searching an optimum guided route from a starting location to a destination, a guided route storage unit for storing guided route data, a map image drawing unit for drawing a map image of the vehicle position using the map data together with a vehicle position mark and displaying the map image on display unit, and a route guide unit for guiding a route to a vehicle using the guided route data, and comprising:

a command unit for issuing a command to preconduct said guided route; and a guided route preconducting unit for outputting audibly, upon said command, route information using said guided route data and said map data for a road crossing only where a course changes on said guided route and for a road crossing where the course on said guided route crosses a road having a width greater than that of a road on said guided route.

15. A navigation apparatus according to claim 14, wherein said map data storage unit is selected from a group consisting of an IC card, a CD-ROM and a hard disk drive.

16. A navigation apparatus according to claim 14, wherein at each of said road crossings the course on said guided route changes by an angle greater than a predetermined angle.

17. A method for searching for an optimum guided route from a starting location to a destination, comprising:

storing guided route data;

issuing a command to preconduct said guided route; and drawing on a display, upon said command, predetermined route information sequentially from the starting location using said stored guided route data for a road crossing only where a course changes on said guided route from a present location to the destination and a road crossing where the course on said guided route crosses a road having a width greater than that of a road on said guided route.

18. A method according to claim 17, wherein at each of said road crossings the course on said guided route changes by an angle greater than a predetermined angle.

19. A method according to claim 17, wherein said route information includes at least names of roads or a name of a road crossing.

20. A method according to claim 19, wherein said route information includes a shape of a road crossing, a course, names of roads or a name of the road crossing.

21. A method for searching an optimum guided route from a starting location to a destination, comprising:

storing guided route data;

storing map data;

issuing a command to preconduct said guided route; and drawing on a display, upon said command, route information sequentially from the starting location using said stored guided route data and said map data only for a road crossing where a course changes on said guided route and for a road crossing where the course on said guided route crosses a road having a width greater than that of a road on said guided route.

22. A method according to claim 21, wherein at each of said road crossings a course on said guided route changes by an angle greater than a predetermined angle.

23. A method for searching for an optimum guided route from a starting location to a destination, comprising:

storing guided route data;

issuing a command to preconduct said guided route; and audibly outputting, upon said command, predetermined route information sequentially from the starting location using said guided route data for a road crossing on said guided route only where a course changes and for a road crossing where the course on said guided route crosses a road having a width greater than that of a road on said guided route.

24. A method according to claim 23, wherein at each of said road crossings the course on said guided route changes by an angle greater than a predetermined angle.

25. A method according to claim 24, wherein said route information includes at least names of roads and a name of a road crossing.

26. A method according to claim 25, wherein said route information includes names of roads or a name of a road crossing, and the course.

27. A method according to claim 23, wherein said route information includes at least names of roads or a name of a road crossing.

28. A method for searching for an optimum guided route from a starting location to a destination, comprising:

storing guided route data;

storing map data;

issuing a command to preconduct said guided route; and outputting audibly, upon said command, route information using said guided route data and said map data for a road crossing only where a course changes on said guided route and for a road crossing where the course on said guided route crosses a road having a width greater than that of a road on said guided route.

29. A method according to claim 28, wherein at each of said road crossings the course on said guided route changes by an angle greater than a predetermined angle.

30. A vehicle navigation apparatus having a route search unit for searching an optimum guided route from a starting location to a destination, a storage unit for storing guided route data, and a route guide unit for guiding a route for the vehicle using the guided route data, and comprising:

a command unit for issuing a command to preconduct said guided route; and a guided route preconducting unit, said guided route preconducting unit comparing the width of said guided route to the width of a road at a road crossing and said guided route preconducting unit drawing on a display, upon said command, predetermined route information sequentially from the starting location using said guided route data for a road crossing where a course changes on said guided route from a present location to the destination and for a road crossing where the course on said guided route crosses a road having a width greater than that of a road on said guided route.

* * * * *